(12) United States Patent
Spinelli

(10) Patent No.: US 6,363,652 B1
(45) Date of Patent: Apr. 2, 2002

(54) DEVICE FOR BIG FISH BAITING

(76) Inventor: Giovanni Spinelli, Via Don Minzoni, 1, I-70010, Sammichele di Bari (IT)

( * ) Notice: Subject to any disclaimer, the term of this patent is extended or adjusted under 35 U.S.C. 154(b) by 0 days.

(21) Appl. No.: 09/446,760

(22) PCT Filed: Jun. 23, 1998

(86) PCT No.: PCT/IT98/00172

§ 371 Date: Mar. 2, 2000

§ 102(e) Date: Mar. 2, 2000

(87) PCT Pub. No.: WO98/58539

PCT Pub. Date: Dec. 30, 1998

(30) Foreign Application Priority Data

Jun. 24, 1997 (IT) ............................. BA97A0038

(51) Int. Cl.⁷ ............................................. A01K 97/02
(52) U.S. Cl. ................................. 43/44.99; 119/51.04
(58) Field of Search ................ 43/44.99; 119/51.04; 220/80

(56) References Cited

U.S. PATENT DOCUMENTS

| | | | | |
|---|---|---|---|---|
| 695,921 A | * | 3/1902 | Forster | 119/51.04 |
| 742,414 A | * | 10/1903 | Hale | 119/51.04 |
| 2,243,896 A | * | 6/1941 | Cupples | 43/44.99 |
| 3,249,257 A | | 5/1966 | Nolt | |
| 3,934,038 A | * | 1/1976 | Kerr | 426/1 |
| 4,173,271 A | | 11/1979 | Copp | |
| 5,205,778 A | | 4/1993 | Korkuch | |
| 5,842,303 A | * | 12/1998 | Abraham et al. | 43/44.99 |

FOREIGN PATENT DOCUMENTS

FR            1250389           3/1961

* cited by examiner

Primary Examiner—Kurt Rowan
(74) Attorney, Agent, or Firm—Alston & Bird LLP

(57) ABSTRACT

It is provided a device for big fish baiting, comprising means (1) for feeding baits; means (2) for supporting said feeding means and fastening them to a craft; means (10) for conveying said baits from the feeding means (1) into a water environment, wherein said conveying means are intended to create in said water environment an appeal wake for big fishes into the proximity of the craft sailing said water environment.

11 Claims, 5 Drawing Sheets

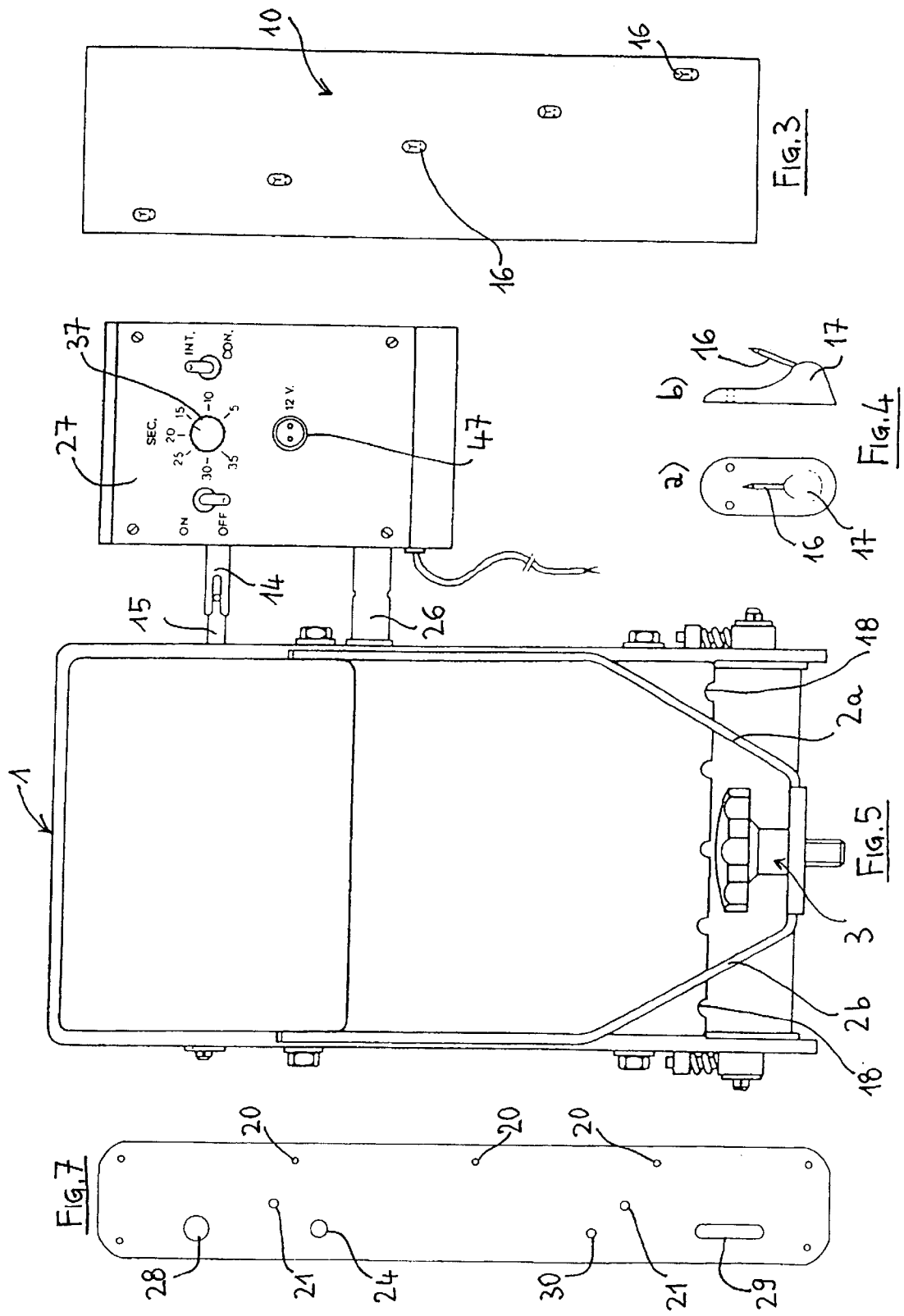

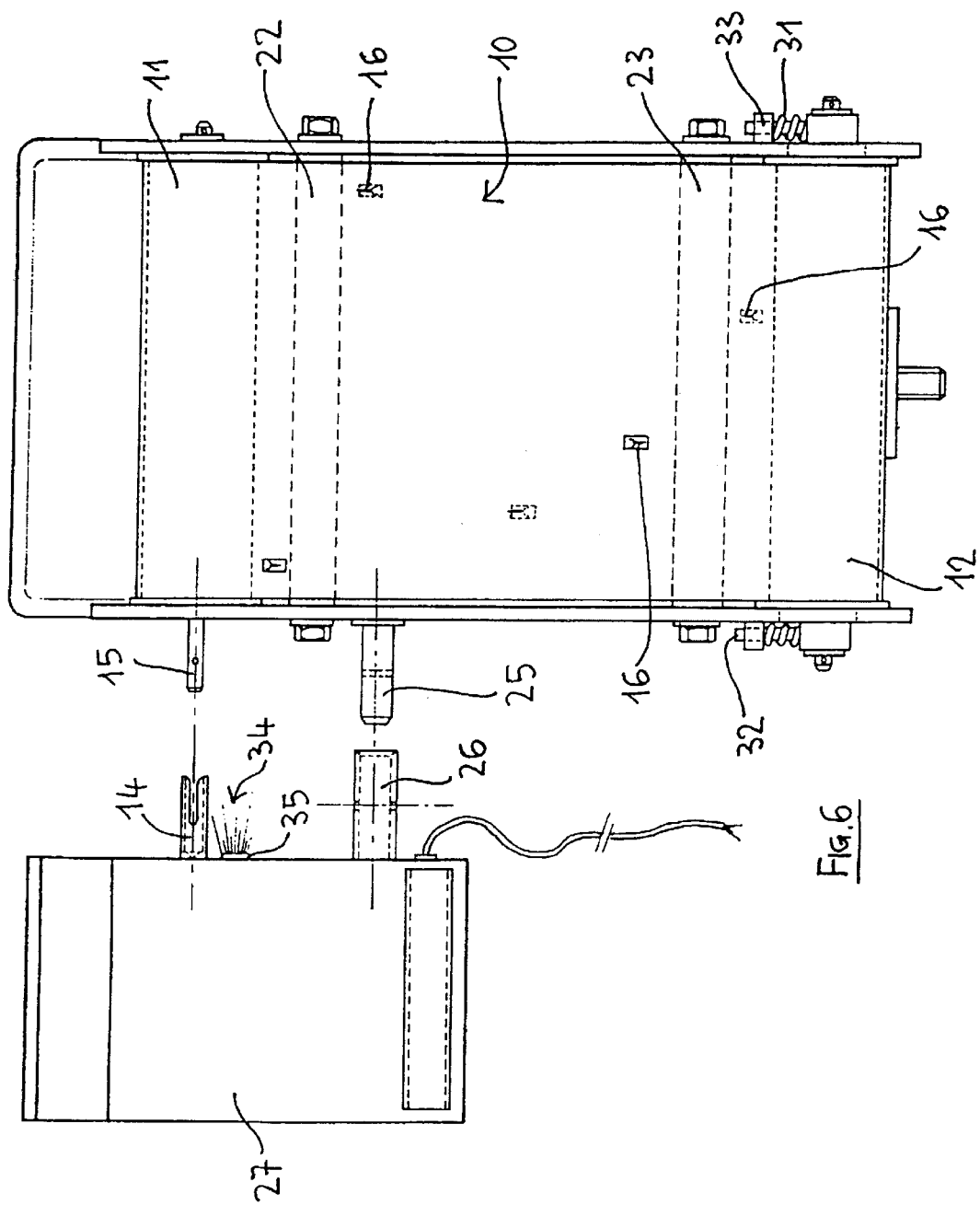

DEVICE FOR BIG FISH BAITING

FIELD OF THE INVENTION

The present invention relates to a device for fish baiting intended for amateurish fishing of big fishes, such as tuna, shark, etc.

BACKGROUND ART

In the prior art, amateurish fishing of big fishes uses:
- either a cage fixed by means of a cable to a craft and containing some little fishes, such as cephalopods or sardines, as baits for big ones,
- or little fishes which are thrown by hand from the craft, so as to create, while the craft advances, a wake appealing to big fishes.

Furthermore, in FR-A-1 250 389 it is disclosed a device for measuring out and distributing doses of a bait mixture, comprising vertical chute means for feeding, under the effect of gravity, means for conveying such doses which consist of endless conveying means continuously driven by appropriate drive means and running firstly upwardly inside the feed chute means along the vertical axis and from a horizontal outlet thereof and then, outside the feed chute means, horizontally and finally according to a sloped path; such endless conveying means are equipped with cup(measuring) means closing the horizzontal outlet of the vertical feed chute means and distributed therealong in such a way that there is always a cup means closing this outlet while the endless conveying means are driven by the drive means.

U.S. Pat. No. 3,249,257 discloses a bait chummer comprising first vertical chute means for feeding reciprocating means entended to chop bait material, while pushing the chopped bait material transverse a horizontal outlet of the first vertical feed chute means, and second vertical chute means intended to receive the chopped bait material from the chummer so as to direct it into the water.

The big fishes which are so baited in the proximity of the craft, are then caught by means of a fishing rod carrying its own bait fixed to its hook.

DISCLOSURE OF THE INVENTION

The present invention seeks to provide an improvement for such an amateurish fishing.

According to an aspect of the present invention, there is provided a device for big fish baiting as specified in claim 1.

An advantage which may be obtainable with the present invention is the creation of a wake appealing to big fishes which, while being effective, avoids manipulation of the baits.

BEST MODE FOR CARRYING OUT THE INVENTION

A preferred embodiment of the present invention is described below, by way of example only, with reference to the following figures:

FIG. 3 is a developped view of the conveyor band shown in FIG. 1 and FIG. 2 and eqipped with gripping means;

Figure 1:
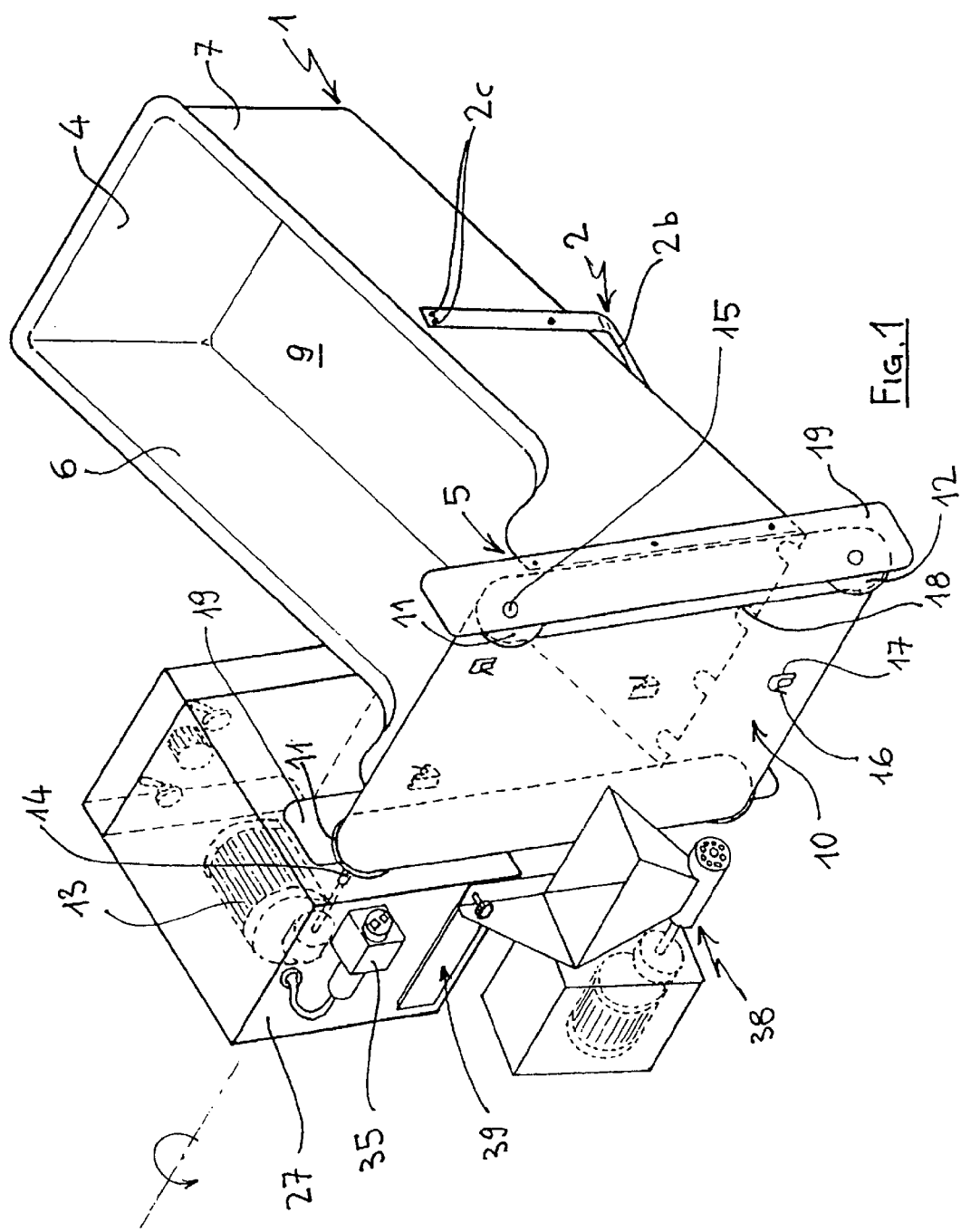
FIG. 1 is a perspective view of a preferred embodiment of the invention.
Figure 2:
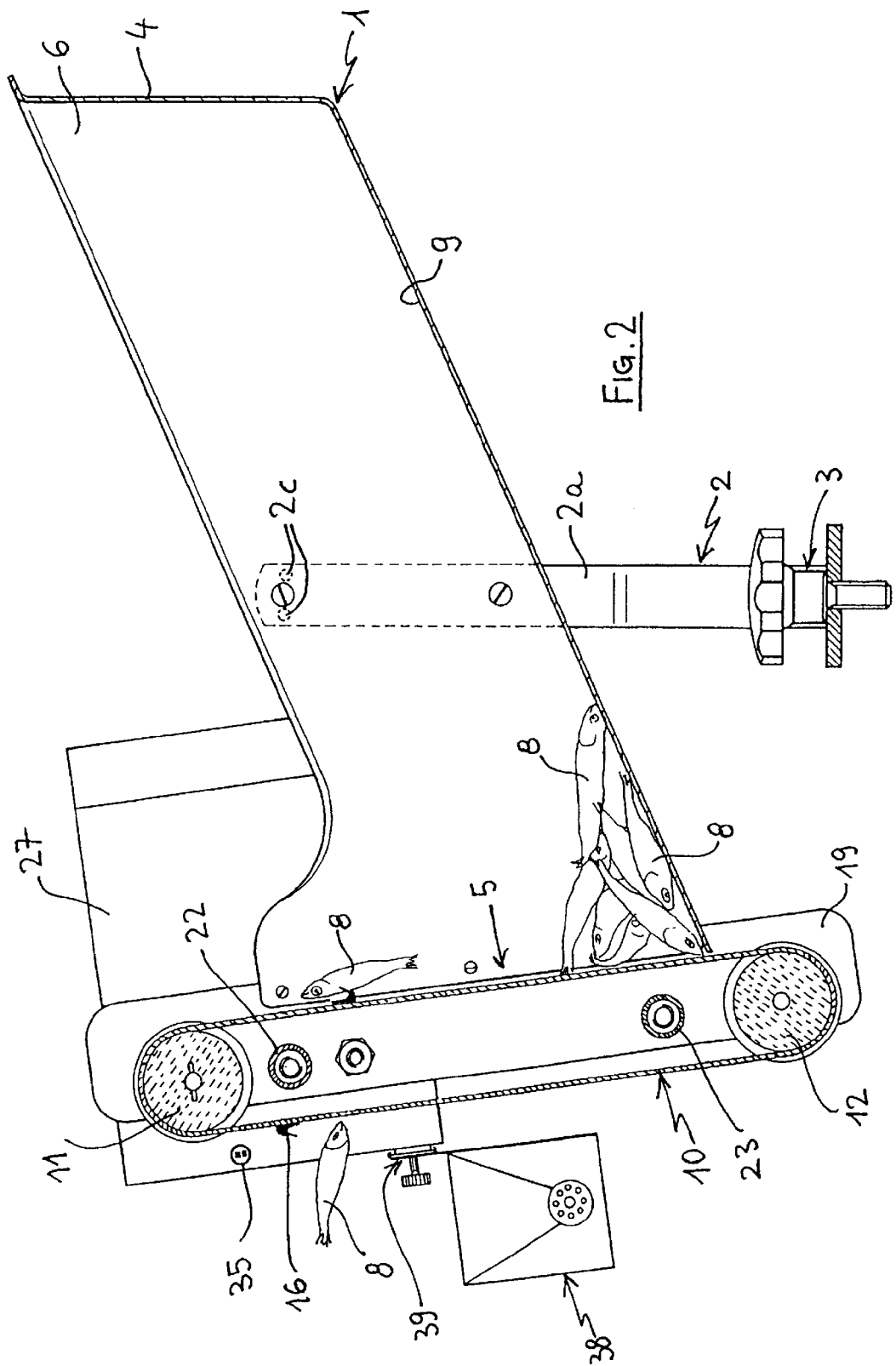
FIG. 2 is a sectional view of the embodiment shown in FIG. 1, according to the longitudinal axis of the oblong container shown therein.

FIGS. 4 a and b are respectively a front and a side view showing in detail the gripping means of the conveyor band shown in FIG. 1 to FIG. 3

Figure 8:
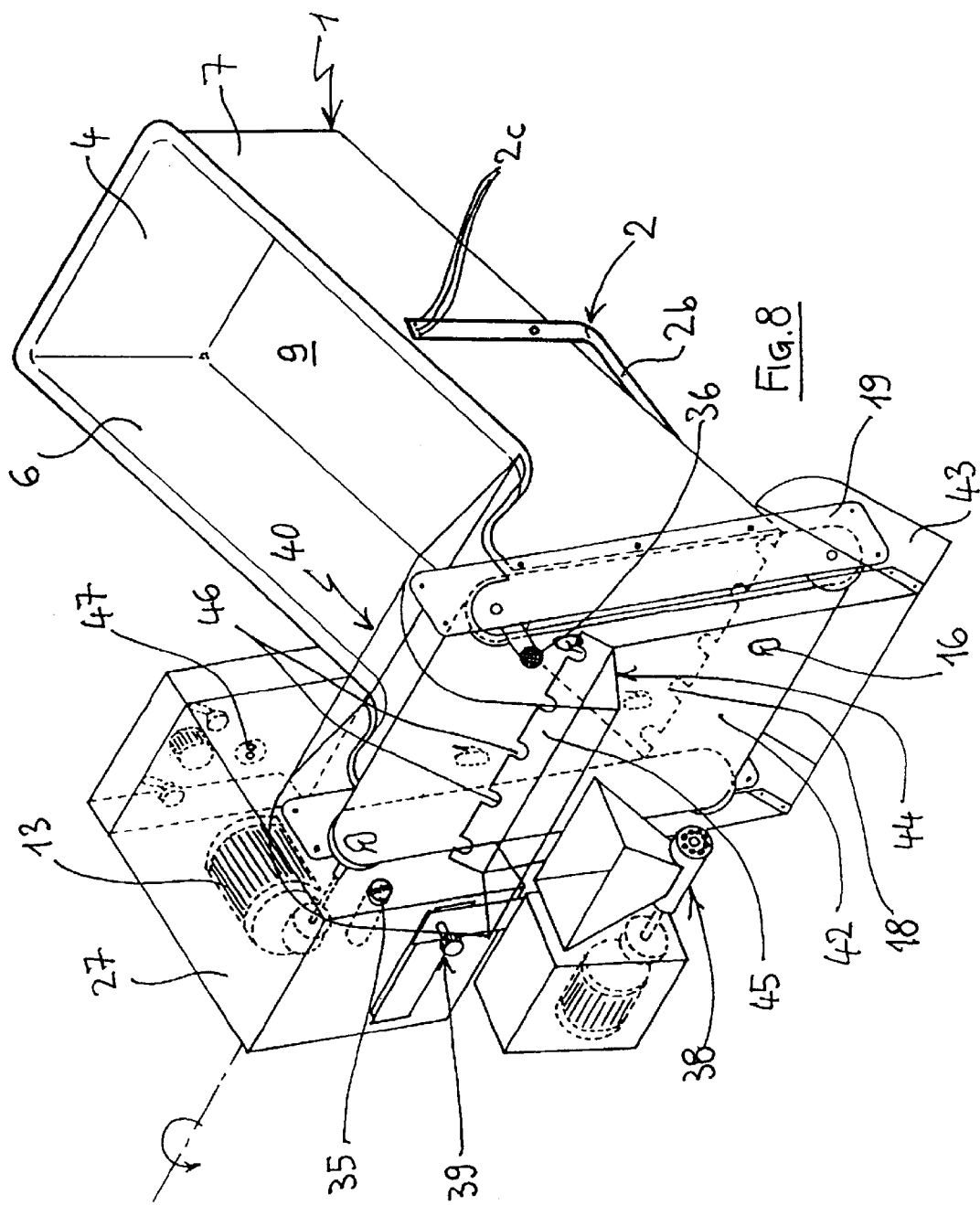

FIG. 5 and FIG. 6 are respectively a back and a front view of the embodiment shown in FIG. 1;

FIG. 7 shows one of two identical side wings by means of which the driving means are connected to the container;

FIG. 8 shows the embodiment of FIG. 1 equipped with a protection casing made from a transparent plastic material.

FIG. 1 and FIG. 2 show an oblong container 1 sloped with respect to fastening means 2 consisting of an approximately V-shaped stirrup which, while supporting the container, allows fixation thereof, by means of a screw-nut tightening 3, to a craft (not shown) sailing the sea, or generally a water environment (not shown).

The container 1, which resembles a mini-toboggan, has an upstream end closed with a wall 4 and a downstream opened end 5 as well as longitudinal walls 6 and 7 connecting these upstream and downstream ends.

When the container 1 is filled with baits 8, such as cephalopods or sardines (see FIG. 2), these latter slide, under the effect of gravity, along the bottom 9 towards the downstream opened end 5, thus feeding means—which will be disclosed in detail hereinafter—intended to convey them towards the sea, so as to create therein an appeal wake for big fishes, such as tuna or shark.

While reducing into practice the present invention it has been apparent that the most effective manner to convey the baits without wasting is to have conveying means able to remove the baits one by one from the feeding container 1 by means of appropriate gripping means fixed to the conveying band 10.

To that effect, the downstream opened end 5 of the container 1 is closed by an upwardly oriented conveying band 10 envelopping two rolls 11 and 12.

The roll 11 is driven by an electric motor 13, supplied by the battery of the craft: see also FIG. 5 and FIG. 6 where are shown the motor shaft 14 and the axis 15 of the driven roll 11.

In order to convey the baits 8 one by one from the feeding container 1, the conveying band 10 is provided with gripping means consisting of hook needles 16 fixed thereon and uniformly spaced longitudinally as well as transversally.

FIG. 1 shows four hook needles fixed on the band, whereas FIG. 6 shows five of such hook needles.

FIG. 3 shows five hook needles 16 on the developped band 10 and it is possible to appreciate the regular longitudinal and transversal spacing between the hook needles: these spacings while being generally different there between are equal in the same direction. It is also possible to appreciate that this regular double spacing concerns the extreme hook needles too when the transversal edges of the band 10 are joined end by end.

In FIG. 4 it is shown the preferred shape of the hook needles 16, supported by a nylon base 17 for fixation to the band 10.

The band 10 is mounted on the rolls 11 and 12, so as to have the hook needles 16 upwardly oriented on the feeding means side and downwardly oriented on the water environment side (see FIG. 2).

Of course, the edge of the downstream opened end of the bottom container has a number of notches 18 equal to the number of hook needles 16, allowing these latter to pass therethrough when the conveying band 10 is driven by the driving means. Such notches 18 allow also liquids (sea water or liquids produced by the very same baits) to flow therethrough.

From FIG. 5, FIG. 6 and FIG. 7 it is clear for a person skilled in the art how to mount the different components of the device provided by the present invention.

Anyway, hereinafter it is briefly disclosed how to carry out the assembly. The rolls 11 and 12 are supported by two lateral identical wings 19. FIG. 7 shows the holes arranged on each wing so as to render effective the assembly.

The holes 20 at the periphery of the wings allow the fixation to the longitudinal walls 6 and 7 of the container 1.

The holes 21 allow the assembly of the two spacing axis 22 and 23 shown by dotted lines in FIG. 6.

The holes 24 allow the assembly of support means 25 and 26 (see FIG. 6) consisting of a muff and a bolt respectively aiming at stabilizing the assembly of the box 27 containing the motor 13 and the circuitry.

Even if a unique hole of the type 24 is sufficient, both wings 19 are provided with such a hole so as to allow the assembly of the box 27 on the left or right side of the container, according to the mounting possibilities on the craft.

The hole 26 allow the assembly of the axis 15 of the roll 11 intended to be driven by the motor shaft 14.

The holes 29 allow the assembly of the axis of the roll 12. These holes are oblong so as to have the possibility to regulate the tension of the band 10. To that effect a spring 31 is mounted on a bolt 32 perpendicular to each end of the axis of the roll 12, this spring being intended to be compressed between each one of these latter ends and a ring 33 fixed to each wing 19 through the holes 30: it is clear that the right adjustment of the band tension is obtained by sliding the bolts 32 in the rings 33, due to the oblong character of the holes 29, and then by tightening in the appropriate position the axis of the roll 12.

Preferably, the container is made from vitro-resin, resistant to see water and easily washable, but it could be made from stainless steel.

The band 10 is made of plastic material.

Hereinafter there is disclosed the operation of the device provided by the present invention.

The motor 13 takes off roll 11 into rotation. Together with the roll 12, the roll 11 takes off the conveying band 10 provided with the hook needles 16, which, by passing upwardly through the notches 18 of the container bottom 9, hook one after the other, among the baits 8 feeded by the feeding means 1, that bait which is intercepted by one of the hook needles. After reaching the top of the conveying band 10 each bait 8 follows a downward path, so that under the effect of its own weight it leaves the corresponding hook needle falling into the water.

At the beginning of the downward path, each bait 8 intercepts the beam 34 emitted by an infrared—ray photo—switch 35. When the nature of the baits 8 (such as sardines) allows the reflection of the beam 34 thereon, this reflection switches the motor 13 off, thus stopping the conveying band 10. This kind of operation corresponds to FIGS. 1 and 6.

When the nature or status of baits 8 (such as cephalopods or sardines with a few or without scales) is improper for beam reflection, the operation of the switch 35 is based on the reflection of the beam on a catadioptrical reflector 36 (see FIG. 8), in the sense that the absence of a reflected beam, corresponding to the interception of a bait 8, switches the motor 13 off.

This kind of operation is illustrated in FIG. 8.

In each case, after interception of the switch beam by a bait, a timer (not shown, intended to be put inside the box 27 containing the motor 13 and circuitry) allows to regulate the time interval after which the motor 13 can operate again, so as to initiate a new cycle for ejecting a new bait. The time interval (in seconds) of the timer can be preselected by means of a potentiometer 37 (see FIG. 6).

This time interval is chosen in function of the sailing speed as well as the speed of the sea current.

Sometimes, especially at the beginning of the creation of an appeal wake, it is desirable to create an appeal wake having a greater linear density of baits in the water (for linear density it is meant the number of baits for unit length of the appeal wake.

In this case, it is appropiate to put the switch 35 in the off position, so as to let the driving means 13 run continuously during a given time, thus raising the baiting probability.

A further increasing of the baiting probability can be obtained by means of a triturator 38 supplied by means of an inlet (see FIGS. 1, 2, 5 and 8). It is fixed to the box 27 by means of a dovetail joint 39 allowing the transversal sliding of the triturator in order to intercept at least one trajectory (at the most two trajectories) of the baits 8 taken off downwardly by a corresponding hook needle 16.

In such a manner, it is possible to create in the water a supplemental appeal wake due to continuous diffusion of a smell spread along said appeal wake by the triturated baits.

Of course, it is useful to construct the triturator from stainless steel.

In order to protect the user from damage due to the presence of the hook needles on the conveying band, it is useful to provide the device shown in FIG. 1 with a protection casing 40. This latter is illustrated in FIG. 8, which differs from FIG. 1 essentially to show the possibility of using five hook needles 16 (instead of the four ones shown in FIG. 1) and of using a catadioptrical reflector 36.

It can be appreciated from FIG. 8 that the protection casing 40 is made from a transparent material, such as plexiglass, so as to let the switch 35 operate while allowing visual control of the device operation.

The transparent protection casing 40 comprises a top portion 41 envelopping the top portion of the conveying band 10, a low portion 42 protecting from the inferior part of the band and a bottom portion 43 orienting the baits falling towards the water.

Of course, the top portion is opened downwardly, as shown by arrow 44, to let the falling of the baits partly in the triturator 38 and partly in the water.

The transversal wall 45 connecting the lateral walls of the protection casing 40 is provided with notches 46 corresponding to the notches 18 arranged on the edge of the container bottom.

Furthermore, the slope of the feeding container 1 can be adjusted by arranging for example at the top of the two branches 2a and 2b of the fastening means 2(see FIGS. 1, 2 and 5) several holes 2c (see FIG. 2): by choosing one pair of such opposing holes 2c, before tightening the branches 2a and 2b to the side walls 6 and 7 of the feeding container, it is possible to adjust the slope thereof.

What is claimed is:

1. A device for big fish baiting, comprising:
   a feed chute adapted for receiving baits, said feed chute having walls and a downstream end;
   means for fastening the feed chute to a water craft intended to sail a water environment, with the walls of the feed chute sloped to direct baits present in the feed chute toward the downstream end;
   an endless conveyor positioned at the downstream end of the feed chute in a generally vertical orientation and defining an upwardly moving run facing the feed chute and a downwardly moving return run on the opposite side thereof;

a drive for moving the endless conveyor; and hook needles fixed on the endless conveyor and spaced longitudinally and transversely from one another, the hook needles being operable for gripping baits as the conveyor is moved upwardly and for removing the baits one by one from the feed chute and for discharging the baits into the water environment so as to create therein a wake appealing to big fishes in the proximity of the water craft.

2. The device as claimed in claim 1, wherein the hook needles are upwardly oriented on said upwardly moving run of the conveyor belt and are downwardly oriented on said return run, and wherein said feed chute has a number of notches formed therein and arranged to allow the hook needles pass therethrough when the conveyor belt is driven by said drive.

3. The device as claimed in claim 1 including a switch mounted adjacent to said conveyor and arranged to sense the movement of a bait gripped on the conveyor, and a timer connected to the switch and to the drive and operable for stopping operation of the drive for a period of time following sensing of a bait by said switch.

4. The device as claimed in claim 3, wherein the switch is an optical switch which is responsive to the reflection of a gripped bait.

5. The device as claimed in claim 3, wherein the switch is an optical switch, and a reflector is mounted cooperating with the switch, the switch being responsive to interruption of an optical beam between the switch and the reflector by a gripped bait.

6. The device as claimed in claim 1, wherein said drive is operated continuously so as to create a wake in the water with a larger linear density of baits.

7. The device as claimed in claim 1, including a triturator mounted to intercept a trajectory of at least one bait removed from the feed hopper by the conveyor so as to receive and triturate periodically at least one bait and create in the water a supplemental wake from the triturated bait.

8. The device as claimed in claim 1, including a protective casing cooperating with the endless conveyor.

9. A device for big fish baiting, comprising:

a feed chute adapted for receiving baits, said feed chute having walls and an open downstream end;

means for fastening the feed chute to a water craft, with the walls of the feed chute sloped to direct baits present in the feed chute toward the downstream end;

an endless conveyor belt positioned at the downstream end of the feed chute obstructing the open end thereof, the endless conveyor belt extending in a generally vertical orientation;

a drive for moving the endless conveyor belt so that the surface of the conveyor belt facing the feed chute is moved upwardly; and a series of hook needles fixed on said conveyor belt and spaced longitudinally and transversely from one another and arranged for gripping baits as the conveyor belt is moved upwardly and for removing the baits one by one from the feed chute.

10. The device as claimed in claim 9, wherein the hook needles are upwardly oriented on the side of the conveyor belt facing the feed chute and are downwardly oriented on the opposite side, and wherein said feed chute has a number of notches formed therein and arranged to allow the hook needles pass therethrough when the conveyor belt is driven by said drive.

11. The device as claimed in claim 9, including a triturator mounted to intercept a trajectory of at least one bait removed from the feed hopper by the conveyor belt so as to receive and triturate periodically at least one bait and create in the water a supplemental wake from the triturated bait.

* * * * *

UNITED STATES PATENT AND TRADEMARK OFFICE
CERTIFICATE OF CORRECTION

PATENT NO. : 6,363,652 B1
DATED : April 2, 2002
INVENTOR(S) : Spinelli

It is certified that error appears in the above-identified patent and that said Letters Patent is hereby corrected as shown below:

<u>Title page,</u>
Item [30], Foreign Application Priority Data, "BA97A0038" should read
-- BA97A000038 --.

Signed and Sealed this

Second Day of July, 2002

*Attest:*

*Attesting Officer*

JAMES E. ROGAN
*Director of the United States Patent and Trademark Office*